(12) United States Patent
Han et al.

(10) Patent No.: US 8,027,114 B1
(45) Date of Patent: Sep. 27, 2011

(54) SPIRAL SERVO DETECTION WITH PHASE-LOCKED LOOP (PLL)

(75) Inventors: Ke Han, Fremont, CA (US); Michael Madden, Mountain View, CA (US); Xueshi Yang, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 170 days.

(21) Appl. No.: 12/467,885

(22) Filed: May 18, 2009

Related U.S. Application Data

(60) Provisional application No. 61/058,034, filed on Jun. 2, 2008.

(51) Int. Cl.
*G11B 5/09* (2006.01)

(52) U.S. Cl. .............................. 360/51; 360/39; 375/341

(58) Field of Classification Search .................. None
See application file for complete search history.

(56) References Cited

U.S. PATENT DOCUMENTS

| | | | |
|---|---|---|---|
| 5,291,499 A | 3/1994 | Behrens et al. | |
| 6,249,398 B1 | 6/2001 | Fisher et al. | |
| 6,366,418 B1 | 4/2002 | McEwen et al. | |
| 6,377,635 B1 | 4/2002 | Cideciyan et al. | |
| 6,501,610 B1 | 12/2002 | Sugawara et al. | |
| 6,504,882 B1 | 1/2003 | Kim | |
| 6,507,450 B1 | 1/2003 | Elliott | |
| 6,603,722 B1 | 8/2003 | Taguchi et al. | |
| 6,732,328 B1 | 5/2004 | McEwen et al. | |
| 6,810,485 B2 * | 10/2004 | McEwen et al. | 713/503 |
| 7,080,313 B2 | 7/2006 | Akiyama et al. | |
| 7,173,783 B1 | 2/2007 | McEwen et al. | |
| 7,248,194 B2 * | 7/2007 | Rutten et al. | 341/155 |
| 7,307,807 B1 | 12/2007 | Han et al. | |
| 7,440,208 B1 | 10/2008 | Zafer et al. | |

OTHER PUBLICATIONS

Abu-Rgheff et al., "A Modified Viterbi Decoder Based Upon Cross Correlation for Use in Bandwidth Efficient Systems," Digital Satellite Communications, 1995, Tenth International Conference, May 15-19, 1995, University of Plymouth, U.K., 8 pages.
Lee, Edward A. et al., "Digital Communication", Second Edition, Kluwer Academic Publishers, 17 pages.
U.S. Appl. No. 10/799,543, filed Mar. 11, 2004, pending, Application As Filed, 54 pages.

* cited by examiner

*Primary Examiner* — Jason Olson

(57) ABSTRACT

The present disclosure includes apparatus, systems and techniques relating to detecting sync marks. In some implementations, an apparatus includes phase locking circuitry that includes a phase calculator to identify a phase of sampled data, and a phase-locked loop to generate an output signal and phase-lock the generated output signal with the calculated phase of the sampled data to produce a phase-locked signal. The apparatus includes detector circuitry to receive phase information of the phase-locked output signal. The detector circuitry includes a detector to generate a stream of decision bits for the sampled data with each bit in the stream being associated with a different phase. The detector circuitry includes an output selector to select at least one bit from the stream based on the received phase information of the phase-locked output signal.

20 Claims, 11 Drawing Sheets

SPIRAL SERVO DETECTION WITH PHASE-LOCKED LOOP (PLL)

CROSS REFERENCE TO RELATED APPLICATIONS

This application claims the benefit of the priority of U.S. Provisional Application Ser. No. 61/058,034, filed Jun. 2, 2008 and entitled "SPIRAL SERVO DETECTION WITH PLL".

BACKGROUND

The present disclosure describes systems and techniques relating to recording data on a computer readable medium.

In magnetic-medium-based storage devices, data can be stored on circular, concentric tracks on a magnetic disk surface. A read-write head can retrieve and record data on a magnetic layer of a rotating disk as the read-write head flies on a cushion of air over the disk surface. When retrieving data, magnetic field variations can be converted into an analog electrical signal, which can then be amplified and converted to a digital signal for signal processing. To guarantee the quality of the information stored on and read back from the disk, the read-write head should be precisely positioned at substantially the center of a track during both writing and reading. A closed-loop servo system, driven by servo information embedded in a dedicated portion of the track, can be used as a reference for positioning the head.

The servo information generally defines the position of the data tracks and is generally written with great accuracy to ensure that the read-write head servo system operates properly. The servo information can be written on each surface as a radially extending set of spokes or wedges. The portion of a servo wedge at a particular track location may contain a sync field, an index mark, a gray coded track number, and two or more fine-positioned offset bursts configured in an echelon across the track. Read-write head positioning relative to a track center can be determined and corrected, if necessary, by reading and noting the respective amplitudes and timings of the offset bursts.

Conventionally, a servo writer is used to write the embedded servo information on the disk surface. A servo writer can include a large base (e.g., granite base) to minimize the effects of vibration. The servo writer also may use precision fixtures to hold the target drive, a precision, laser-interferometer-based actuator arm positioning mechanism to place the arms radially with respect to the axis of rotation of the disks in the drive, and an external clock head to position the servo wedges in time. Conventional servo writers are typically large in size and expensive. Further, as track density increases, the servo writing time required by a servo writer to write the servo information also increases, which can create a bottleneck in the disk drive manufacturing process.

Various attempts have been made to reduce usage of such servo writers. For example, some servo writing techniques have used a servo writer to generate high quality seed wedges, from which additional servo wedges can be generated by the disk drive itself using propagation self-servo write techniques. Other approaches have tried to eliminate the traditional servo writer altogether by pre-writing the disk with a low frequency reference pattern. Yet another approach has been to attempt an increase in throughput per servo writer by writing a spiral servo pattern on the disk, from which servo wedges can be generated by the disk drive itself.

SUMMARY

The present disclosure includes apparatus, systems and techniques relating to sync mark detection. Sync marks are used to write servo information on a computer readable medium. According to an aspect of the described systems and techniques, an apparatus includes one or more of the following features. The apparatus includes phase locking circuitry including a phase calculator to identify a phase of a sampled data. The phase locking circuitry includes a phase-locked loop to generate an output signal and phase-lock the generated output signal with the identified phase of the sampled data to produce a phase-locked signal. The apparatus includes detector circuitry to receive the sampled data and communicate with the phase locking circuitry to obtain phase information of the phase-locked output signal. The detector circuitry includes a detector to generate a stream of decision bits for the received sampled data. Each bit in the stream is associated with a different phase. Also, the detector circuitry includes an output selector to select at least one bit from the stream based on the received phase information of the phase-locked output signal.

Implementations can optionally include one or more of the following features. The phase locking circuitry can include a buffer to communicate with the phase calculator. The buffer is configured to store the sampled data. The phase locking circuitry can includes a target phase detector to check the phase of each bit to detect a target phase that indicates a location of a sync mark. The output selector can be configured to select the at least one bit based on the detected target phase that indicates the location of the sync mark. The phase-locked loop can includes a comparison logic unit to generate an error signal based on a detected difference between the sampled data and the generated output signal. The phase-locked loop can include a phase offset detector to identify at least a phase offset between the sampled data and the generated output signal based on the generated error signal. The phase-locked loop can include a phase modifier to modify the phase of the generated output signal based on the identified phase offset to phase-lock the generated output signal with the sampled data to produce the phase-locked signal. The phase-locking circuitry can be configured to phase-lock the generated output signal with the sampled data. The sampled data can be undergoing a phase drift or a frequency offset. The detector circuitry can include Viterbi detector circuitry to improve the phase-lock.

Implementations can optionally include one or more of the following features. The apparatus can include a head-disk assembly that includes a transducer including a read-write head having a read gate and a write gate, and a spindle to rotate a machine-readable medium. The apparatus can include a control unit to communicate with the head-disk assembly, the phase-locking circuitry and the detector circuitry to cause the head-disk assembly to perform various operations. For example, the control unit can cause the head-disk assembly to obtain the sampled data using the read gate of the read-write head. The control unit can cause the head-disk assembly to write a servo wedge on a surface of the machine-readable medium based on at least one received bit that indicates the location of the sync mark. The control unit can communicate with the head-disk assembly to cause the head-disk assembly to obtain the sampled data using zero-phase-start. The sampled data can include an asynchronous waveform.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiments below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

Thus, according to another aspect of the described systems and techniques, a method performed by a data processing device can include one or more of the following features. The method performed by a data reading device includes obtaining sampled data. The method includes calculating a phase of the sampled data, which includes identifying a target phase that indicates a location of a sync mark. The method includes phase-locking an output of a phase-locked loop with the calculated phase of the sampled data. The method includes generating a stream of decision bits for the sampled data; and selecting at least one bit from the stream that corresponds to the identified target phase.

Implementations can optionally include one or more of the following features. The stream of decision bits can include a stream of Viterbi decision bits for the sampled data. The method can include checking the phase for each bit to detect the target phase that indicates the location of the sync mark. The method can include selecting the at least one bit from the stream based on the detected target phase that indicates the location of the sync mark. Phase-locking an output of a phase-locked loop with the sampled data can include generating an error signal based on a detected difference between the sampled data and the output of the phase-locked loop. Phase-locking can include identifying a phase offset between the sampled data and the output of the phase-locked loop based on the generated error signal. Phase-locking can include modifying a phase of the output signal based on the identified phase offset to phase-lock the output of the phase-locked loop with the sampled data. Zero-phase-start can be used to generate the sampled data from input data. Obtaining the sampled data can include receiving an asynchronous waveform. Phase-locking the output of a phase-locked loop with the sampled data can include phase-locking the output with the asynchronous waveform. The asynchronous waveform can be undergoing a phase drift or a frequency offset. The method can include identifying the location of the sync mark based on the detected target phase. Angular and radial locations of a read-write head can be detected based on the identified location of the sync mark. The read-write head can be positioned based on the identified locations of the read-write head to write a servo wedge on a surface of a machine-readable medium.

The described apparatus, systems and techniques can result in one or more of the following advantages. An improved self-servo write process can determine the servo location for multiple disks using ramp-spirals. The servo information written in ramp-spirals can be used to write the servo wedges. Also, the phase can be accurately detected to compensate for frequency offset errors and phase changes. Accurate phase detection can be obtained even in the absence of timing recovery for sampling the read-back (sampled) waveform. In addition, the correct phase can be detected in the presence of delayed phase information from the phase modulation. Also, the PLL described in this specification can be used to obtain correct phase of the sampled waveform in the presence of frequency offset in the sampled waveform. Further, the phase lock can be updated periodically to obtain frequently updated phase detection.

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

The systems and techniques described herein can be implemented as one or more devices, such as one or more integrated circuit (IC) devices (e.g., a compact disk driver, a digital versatile disk driver, etc.) For example, the systems and techniques described in this specification can be implemented to detect sync marks used to write servo wedges on a computer readable medium.

Figure 1:
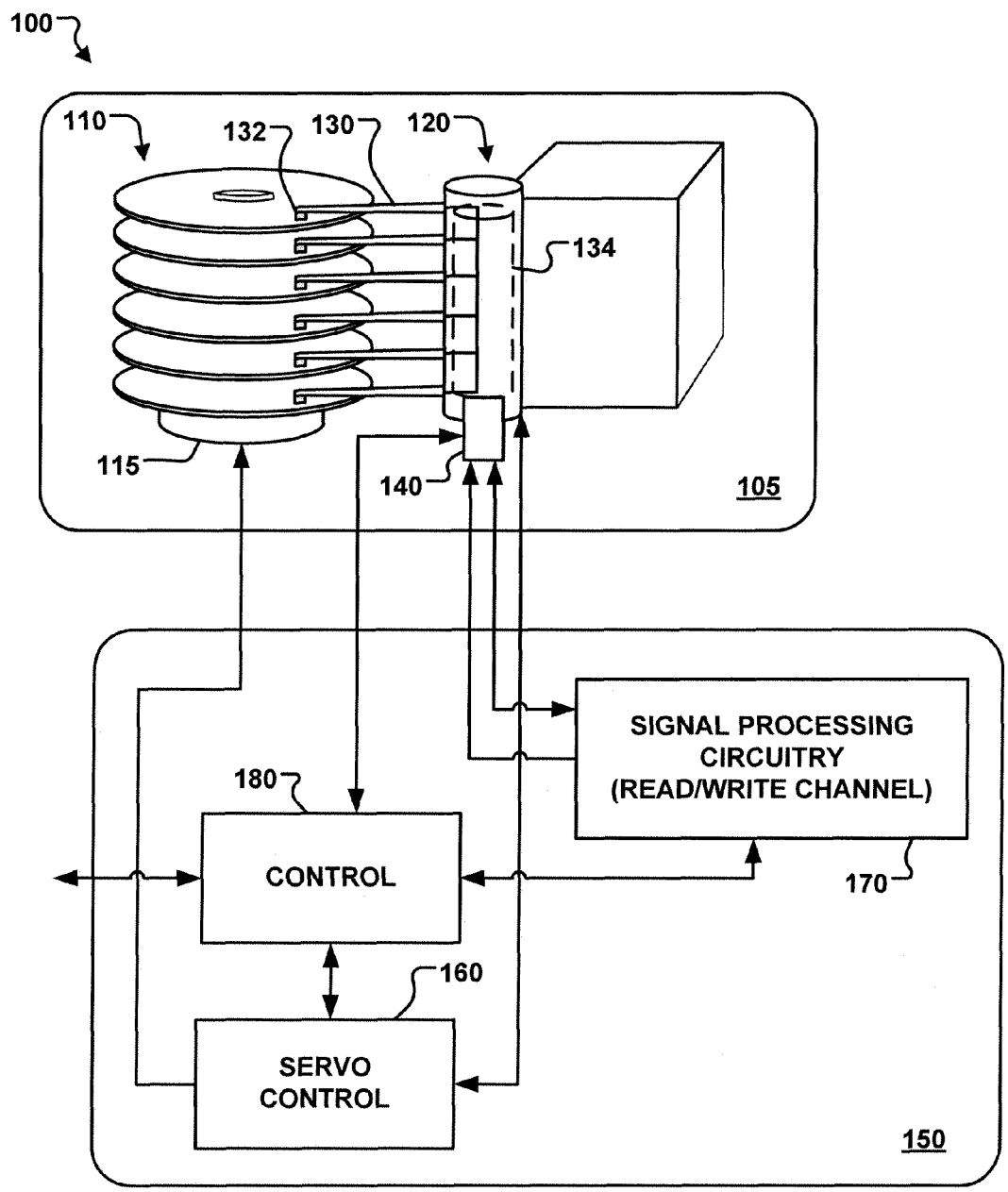
FIG. 1 is a block diagram showing an example system that employs self-servo-write using ramp-tracks.

FIG. 1 is a block diagram showing an example system 100 that employs sync mark detection. The system 100 can be implemented as a disk drive used to detect the sync marks used to write servo wedges as described in this specification. The system 100 includes a head-disk assembly (HDA) 105 and drive electronics 150 (e.g., a printed circuit board assembly (PCBA) with semiconductor devices). The HDA 105 includes one or more disks 110 mounted on an integrated spindle and motor assembly 115. The spindle and motor assembly 115 rotates the disk(s) 110 under read-write head(s) 132 connected with a head assembly 120 in the HDA 105. The disk(s) 110 can be coated with a magnetically hard material (e.g., a particulate surface or a thin-film surface) and can be written to, or read from, a single side or both sides of each disk 110. For example, information can be written to the disk 110 using longitudinal magnetic recording or perpendicular magnetic recording techniques.

A read-write head 132 on an arm 130 can be positioned as needed to read data on a disk 110. A positioning device 134, such as a voice coil motor (VCM), can be used to position the read-write head 132 over a desired track. The positioning device 134 can be located within HDA 105, such as in connection with the head assembly 120. The arm 130 can be a pivoting or sliding arm and can be spring-loaded to maintain a proper flying height for the read-write head 132 in any drive orientation. A closed-loop head positioning system can be used.

The HDA 105 can include a preamp/writer 140, where head selection and sense current value(s) can be set. The preamp/writer 140 can amplify a read signal before outputting the read signal to signal processing circuitry 170. The signal processing circuitry 170 can include a read signal circuit, a servo signal processing circuit, and a write signal circuit.

Signals between the HDA 105 and the drive electronics 150 can be carried for example through a flexible printed cable. A controller 180 can direct a servo controller 160 to control mechanical operations, such as head positioning through the head assembly 120 and rotational velocity control through the motor assembly 115. The controller 180 can be one or more IC chips (e.g., a combo chip), which can include read-write channel signal processing circuitry 170. The controller 180 can be a microprocessor and a hard disk controller. The drive electronics 150 can also include various interfaces, such as a host-bus interface, and memory devices, such as a read only memory (ROM) for use by a microprocessor, and a random access memory (RAM) for use by a hard disk controller. The read-write channel 170 can include error correction circuitry.

The system 100 includes a self-servo-write controller that causes servo information to be written on the machine-readable medium as described. The self-servo-write controller can be integrated into a device, such as a read-write channel transceiver device (e.g., the read-write channel signal processing unit 170) suitable for use in a magnetic recording system. The self-servo-write controller can be composed of multiple sets of coordinating circuitry and can be integrated with the components described above or organized into a separate component of a disk drive. For example, the self-servo-write controller can be integrated into the controllers 160, 180, the read-write channel signal processing circuitry 170, the preamp/writer 140, or various combinations of these components (e.g., the components 160, 170, 180 can all be combined into a single integrated circuit).

Figure 2:
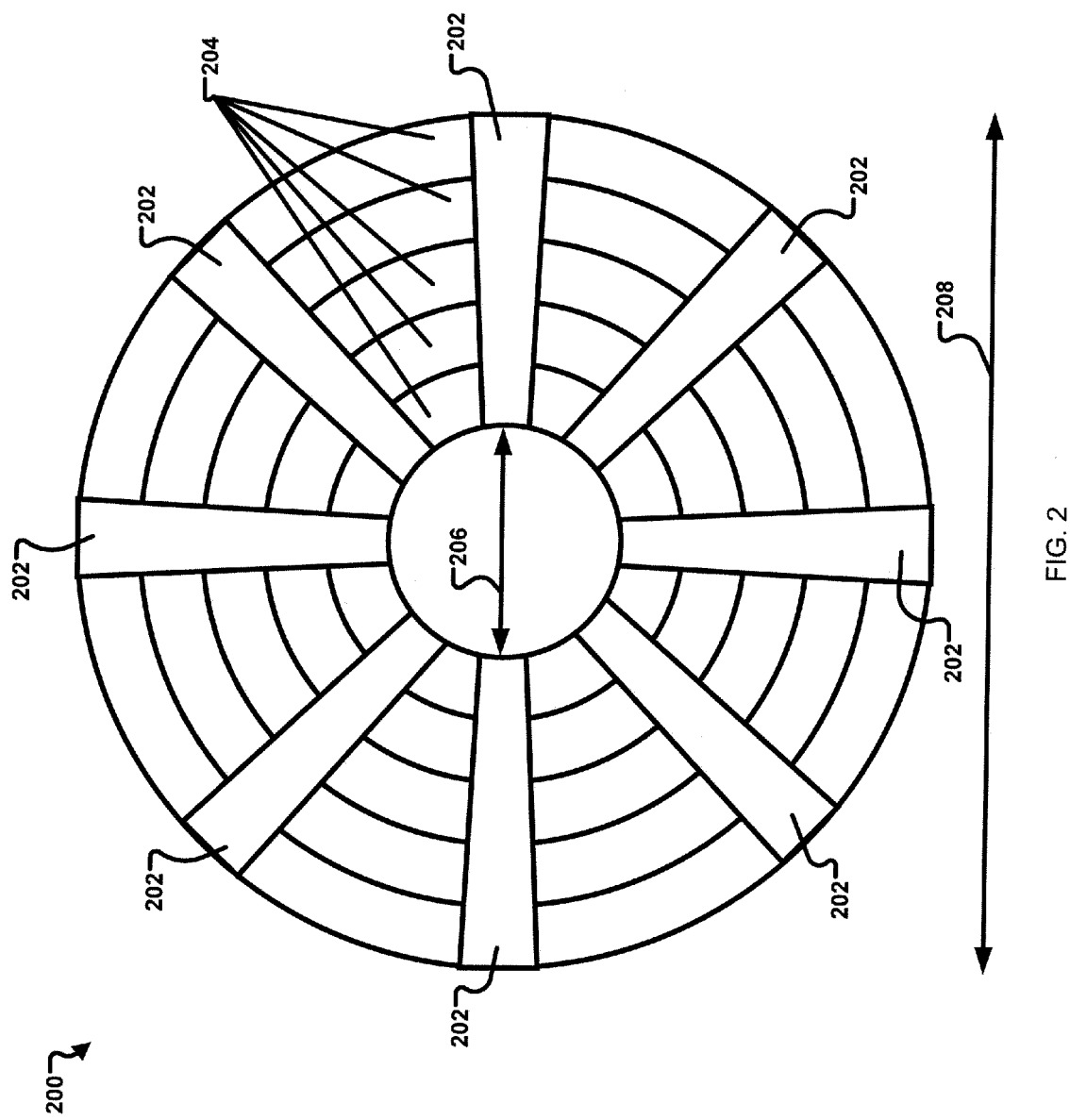
FIG. 2 shows an example disk surface that includes servo spokes or wedges.

FIG. 2 shows an example surface 200 of disk surface that includes servo spokes or wedges. The servo wedges can be written using system 100, for example. The surface 200 includes servo wedges 202 extending out from the inner diameter (ID) 206 to the outer diameter (OD) 208. The servo wedges 202 are written across circular or concentric tracks of data 204 on the surface of the machine readable medium.

The system (e.g., system 100) can write the servo wedges 202 to include information that indicates the servo locations. As described above, servo information generally defines the position of the data tracks to ensure that the head servo system operates properly. The portion of a servo wedge at a particular track location may contain a sync field, an index mark, a gray coded track number, and two or more fine-positioned offset bursts configured in an echelon across the track. Head positioning relative to a track center can be determined and corrected by reading and noting the respective amplitudes and timings of the offset bursts.

Self-servo write techniques as described in this specification can be used to write servo wedges without using a separate servo writer. A system as described in this specification (e.g., system 100) can perform a self-servo write process that uses spiral servo reference tracks to accurately write the servo wedges that indicate the servo location.

Instead of slowly writing servo information on every track, a much smaller number of spiral servo reference tracks (e.g., with one or more particular data patterns) can be written from ID to OD on a disk surface by moving the write head at a constant linear velocity from ID to OD evenly while the disk is spinning at a constant angular velocity. The spiral servo reference tracks provide a defined pattern over the disk surface but are not themselves servo information, as they cannot be used as a master reference by a disk drive during normal operation to locate tracks and sectors for data storage.

The spiral servo reference tracks can be used (e.g., by the disk drive itself) to acquire timing information used in accurately detecting the position of the head, both radially and circumferentially. This timing information can then be used (e.g., by the disk drive itself) to write servo information (e.g., conventional servo patterns) onto one or more disk surfaces, including the disk surface with the spiral reference tracks. For example, the system 100 can be used in a manufacturing process to put spiral servo reference tracks on a single platter in a hard drive. Then the hard drive's own read-write head(s) and servo system can be used to write servo information onto all the platters in the disk drive based on the timing information acquired from the spiral servo reference tracks.

Figure 3:
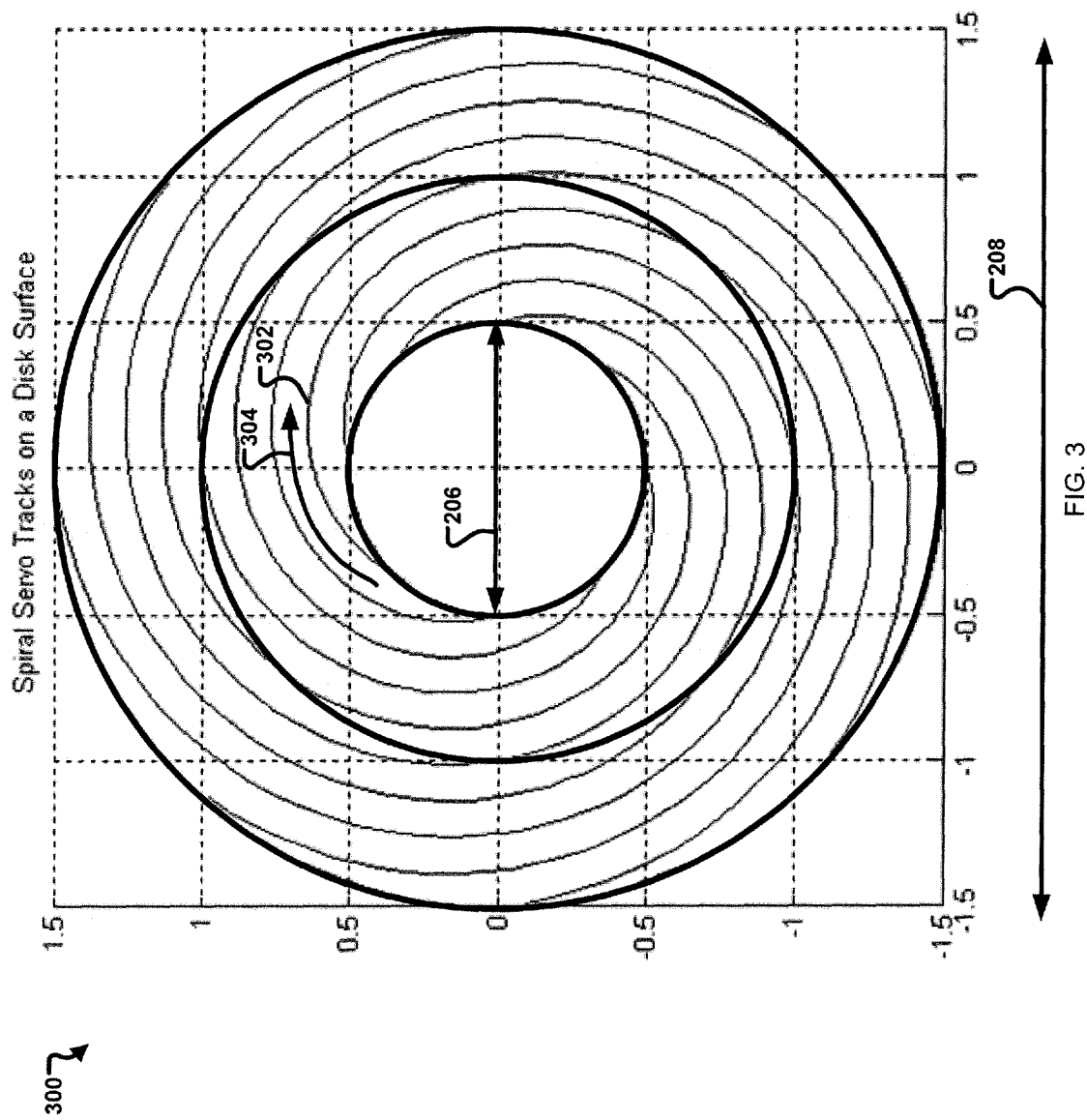
FIG. 3 shows example spiral servo reference tracks written on a disk surface.

FIG. 3 shows example spiral servo reference tracks written on a disk surface 300. The system (e.g., 100) can write each spiral servo reference track 302 from ID 206 to OD 208 in clockwise direction 304 in one spiral sweep.

The spiral servo reference tracks 302 are used to write the servo wedges (e.g., servo wedges 202). A disk may include more than one writable surface, and a separate read-write head is used to write the servo wedges for each surface. In some embodiments, instead of having to write the servo wedges for each surface separately, one set of spiral servo reference tracks can be written on one surface of the disk. The same spiral servo reference tracks on the one surface can be used to write the servo wedges on all surfaces. The read-write head reading the servo information from the spiral servo reference tracks on the one surface communicates the read information to other read-write head to write the servo wedges on all surfaces.

Also, the self-servo write process as described in this specification can be used to write the spiral servo reference tracks on just one disk, and the same spiral servo reference tracks can be used to determine the servo location for other disks. Then the spiral servo reference tracks can be used to write the servo wedges for all disks. However, the above described writing to one disk is not limiting and other arrangements are also possible.

Figure 4:
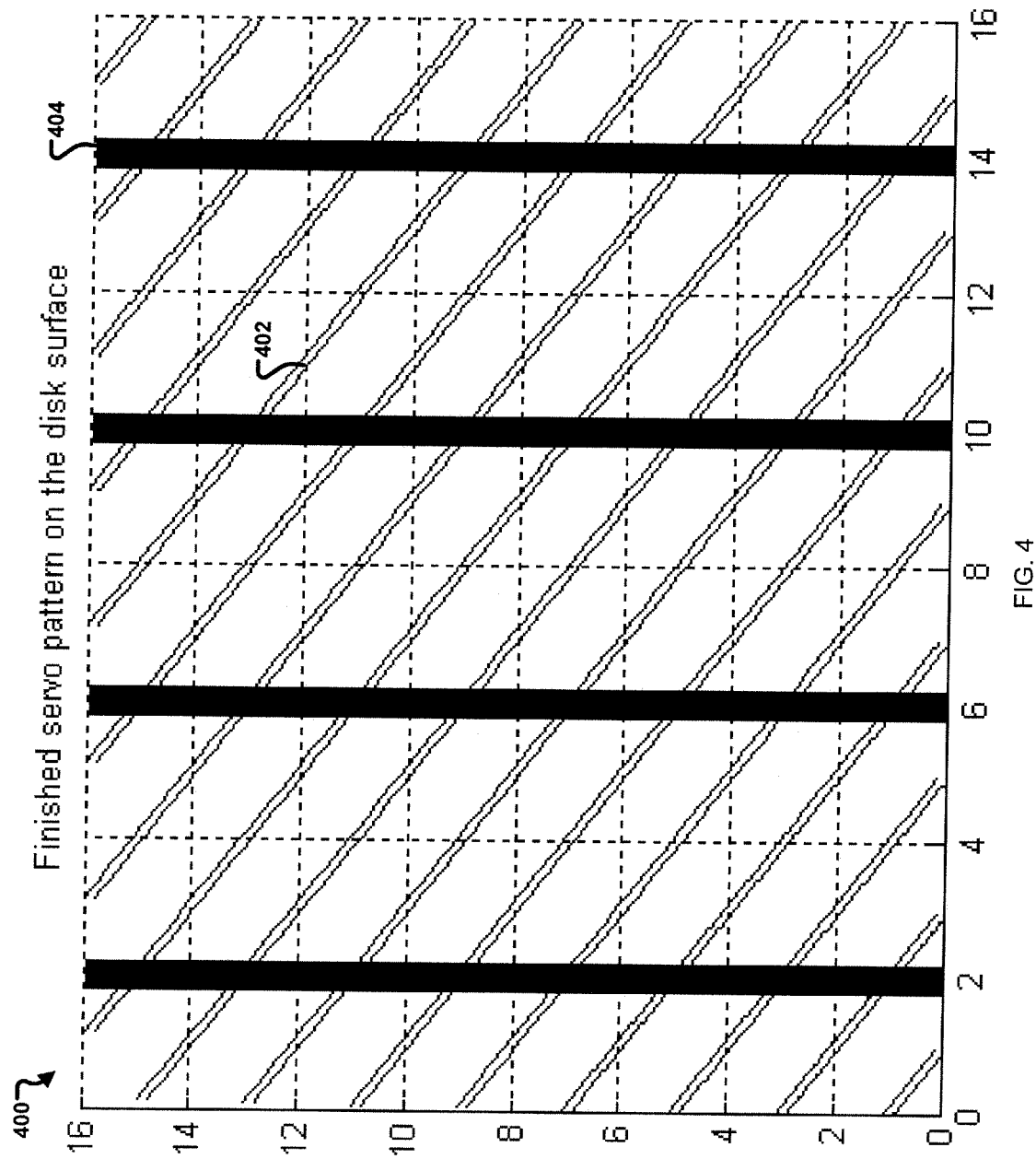
FIG. 4 shows an example finished servo pattern on a disk surface

FIG. 4 shows an example finished servo pattern on a disk surface 400. The diagonal lines 402 represent the spiral servo reference tracks and the vertical lines 404 represents the finished servo wedges that extend from ID to OD. When the servo wedges are finished, the spiral servo reference tracks are overwritten by data tracks.

FIGS. 3 and 4 illustrate the track patterns on the disk surfaces generally and do not indicate particular dimensions or units. The finished servo pattern shown can include conventional servo information, which is written in servo spokes or wedges 202, 404 over the spiral tracks 302, 402 on the disk surface 300, 400. The number of spiral tracks 302, 402 can be at least twice as large as the number of servo spokes 202, 404 to be written on each surface. This can help in guaranteeing that even if some of the spiral tracks 302, 404 are over-written by the servo spokes 202, 404 during the self-servo writing process, there are still enough spiral tracks 302, 402 to provide sufficient head-positioning information for the process to go on to completion. Once the servo information has been written, the spiral tracks 302, 402 are no longer needed and can be overwritten by data tracks.

Figure 5:
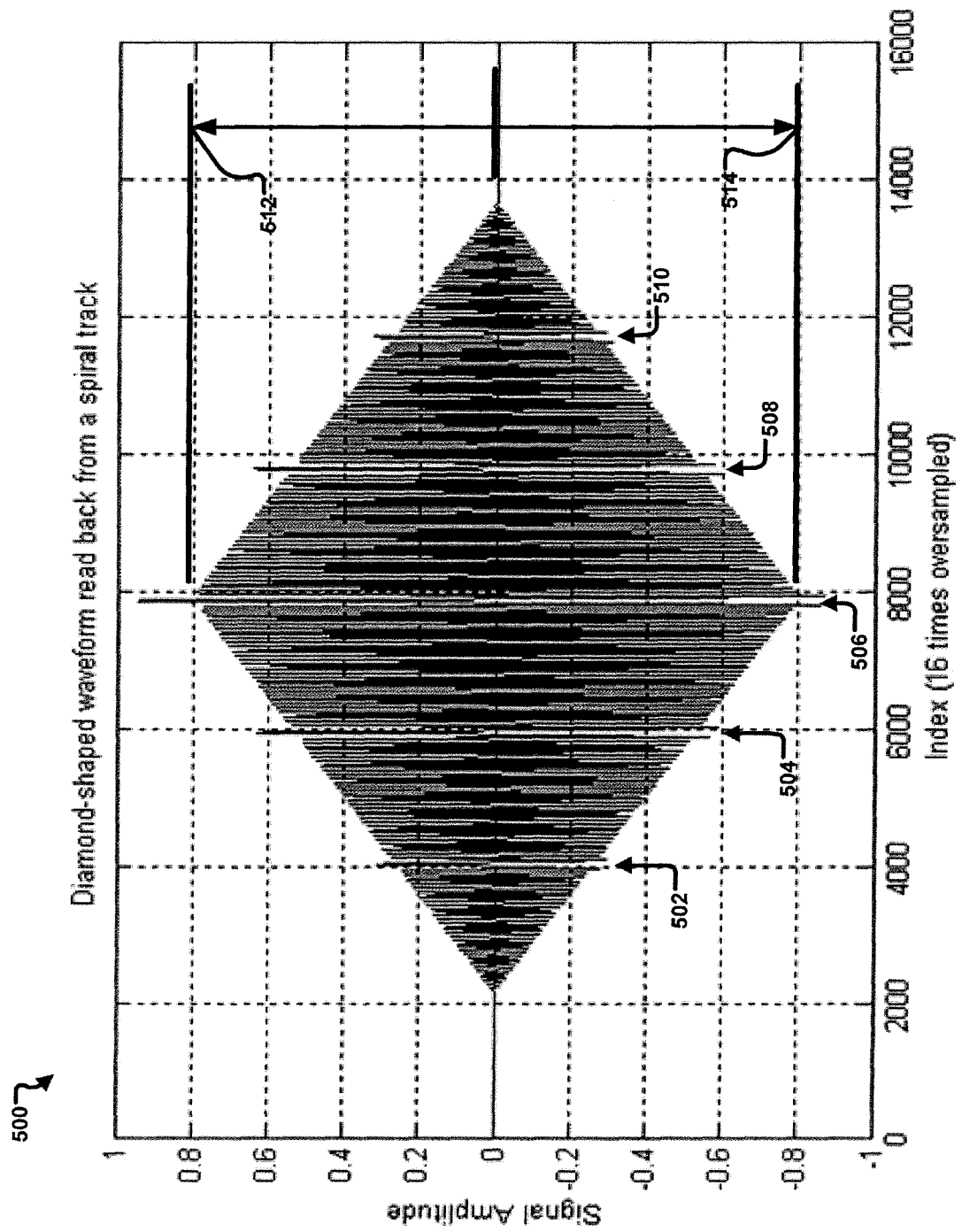
FIG. 5 shows example diamond-shaped waveform read back from a read-write head as the read-write head intersects spiral servo reference tracks.

FIG. 5 shows an example diamond-shaped waveform 500 read back from a read-write head as the read-write head intersects spiral servo reference tracks. The diamond shaped waveform 500 is obtained by reading a spiral servo reference track as though it were a circular, concentric track. The x-axis shows the amplitude of the diamond-shaped waveform and the y-axis represents an index of samples (the data being sixteen times oversampled for purposes of illustration). As the read-write head moves around the disk, the read-write head intersects the spiral servo reference tracks at an angle. Because of this angle, the signal the head picks up from the spiral track has diamond-shaped amplitude. The diamond-shaped signal from the read-write head is a sinusoidal waveform with amplitude that increases as the read-write head nears the spiral servo reference tracks. When the read-write head is inside the spiral servo reference track, the amplitude is at its maximum 512, 514. The increasing amplitude of the sinusoidal waveform generates the overall diamond-shape.

The data pattern in a spiral-servo reference track can be a repeating sequence of multiple one-symbols followed by a zero-symbol. For example, the symbol sequence can be a repeating pattern of [ . . . 1 1 1 0 1 1 1 . . . 1 1 1 0 1 1 1 . . . 1 1 1 0 1 1 1 . . . ]. This reference track pattern can be generated using gray-coded symbols. The Manchester codes for a one-symbol and a zero-symbol can be mapped to 1100 and 0011 respectively. Thus, the bit sequence using the Manchester code can be [ . . . 1100|1100|1100|0011|1100|1100|1100 . . . ]. The read-back samples should be correctly framed into groups of 4 samples: [ . . . |s0s1s2s3|s4s5s6s7|s8s9s10s11|s12s13s14s15| . . . ]. The system performs the detection once every 4 samples on the right phase. For example, when the pattern is 29 one-symbols followed by 1 zero-symbol, the length of the repeating pattern is 30 Gray coded symbols or 120 channel bits. One repetition of the sequence is referred to as one frame, and a typical length of the diamond-shaped waveform 500 can be 6 frames, or 720 channel bits.

Within the diamond-shape waveform, gaps 502, 504, 506, 508 and 510 exists at the location of a zero symbol in the sequence of one symbols. In the example shown in FIG. 5, a gap 506 is shown at the peak or maximum amplitude. Four additional gaps 502, 504, 508 and 510 are shown, two to the left and two to the right of the peak. These zero symbols serve as landmarks (i.e., sync marks) for additional accuracy in deciding timing and can be accurately and reliably located in the waveform 500. Thus, the gaps 502, 504, 506, 508 and 510 represent the location of sync marks in the servo information, which are used to accurately determine the position of the read-write head.

In addition to other factors that affect the detection of the zero-symbols, such as changing amplitude and noise, there is also the sampling phase and the polarity of the waveform. In practice, the sampling phase and the polarity of the waveform 500 may be unknown when it comes time to read a spiral servo reference track (e.g., a new read operation can require a new stimulating current for the read head, which can impart a random polarity to the read signal in a disk drive). The detected positions of these sync marks are used to detect the angular and radial location of the head.

Accurately detecting the sync marks can be difficult for various reasons. The read-back waveforms are continuous time waveforms that are sampled beginning at an arbitrary point in time and timing recovery is not available for sampling the read-back waveform. In addition, frequency offsets that exist in the spiral servo reference track detection add to the difficulty. Further, the phase within the read-back waveforms can change and produce phase jumps in the diamond-shaped waveforms.

Figure 6:
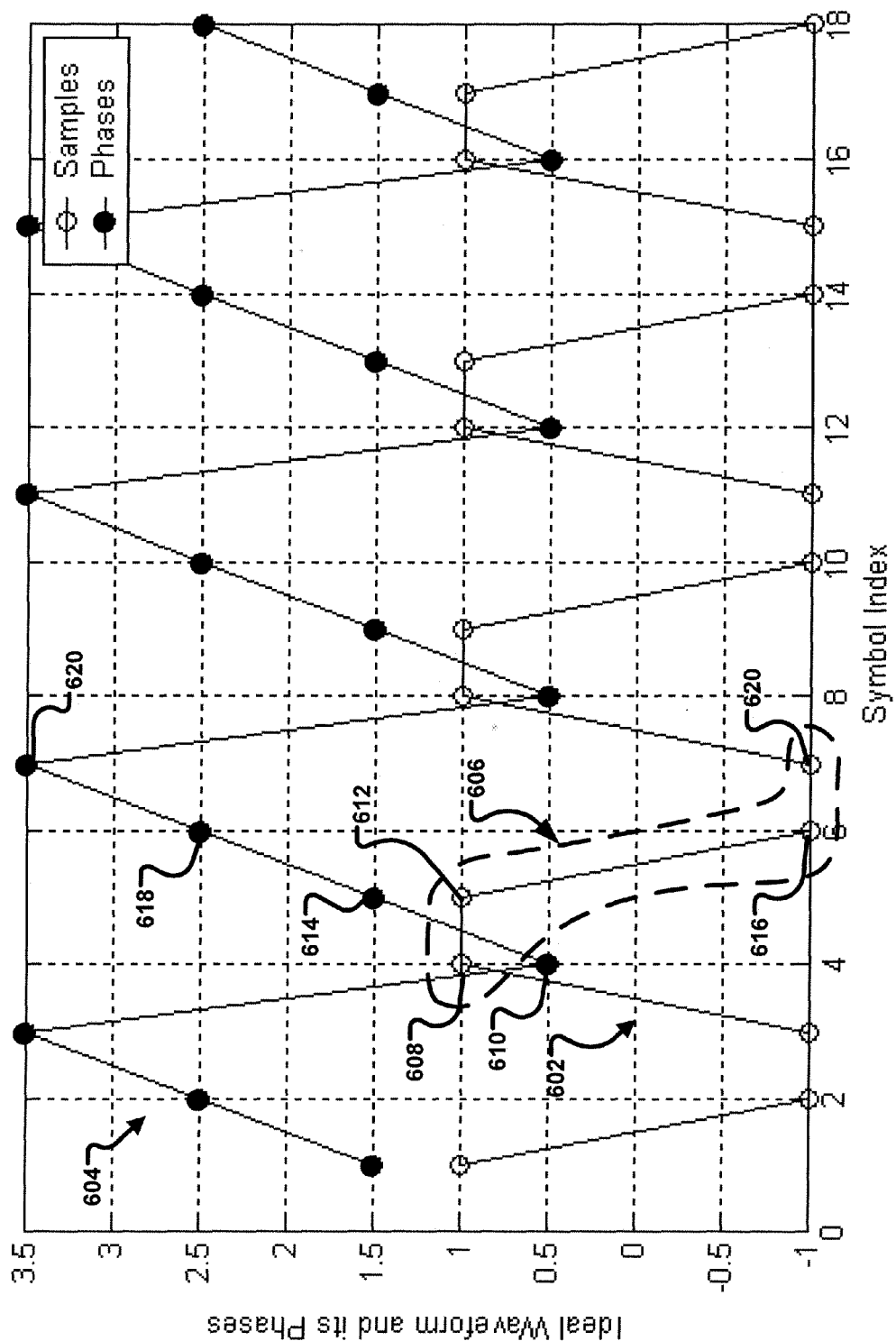
FIG. 6 shows example phases of an ideally sampled waveform.

FIG. 6 shows example phases of an ideal sampled waveform. The open circles 602 represent the sampled waveform, and the filled circles 604 represent the corresponding phase for the sampled waveform 602. The ideal sampled waveform is sampled with an ideal sampling frequency of 4 samples per sampling period (sinusoidal period), 4T. An example sampling period 606 is shown with 4 samples 608, 612, 616 and 620 that represents one cycle of the sampled sinusoidal waveform.

The first one 608 of the 4 samples in the sample period 606 has a corresponding phase of 0.5T (610). The second through 4$^{th}$ samples 612, 616 and 620 have corresponding phases of 1.5T (614), 2.5T (618) and 3.5T (622). For a 4T period, 1T equals 90 degrees. Once the phase of the sampled waveform is determined, the determined phase information is used to perform sync mark detection once every 4 samples on the correct phase.

Compared to the ideal waveform shown in FIGS. 5-6, the phases of asynchronous waveforms can be difficult to ascertain. The self-servo write techniques as described in this specification combine a phase-locked loop (PLL) with a Viterbi detector to accurately detect the phase in an asynchronously sampled waveform. The phase of the sampled waveforms can be accurately detected even in the presence of frequency offset errors and phase changes or drifts.

Figure 7:
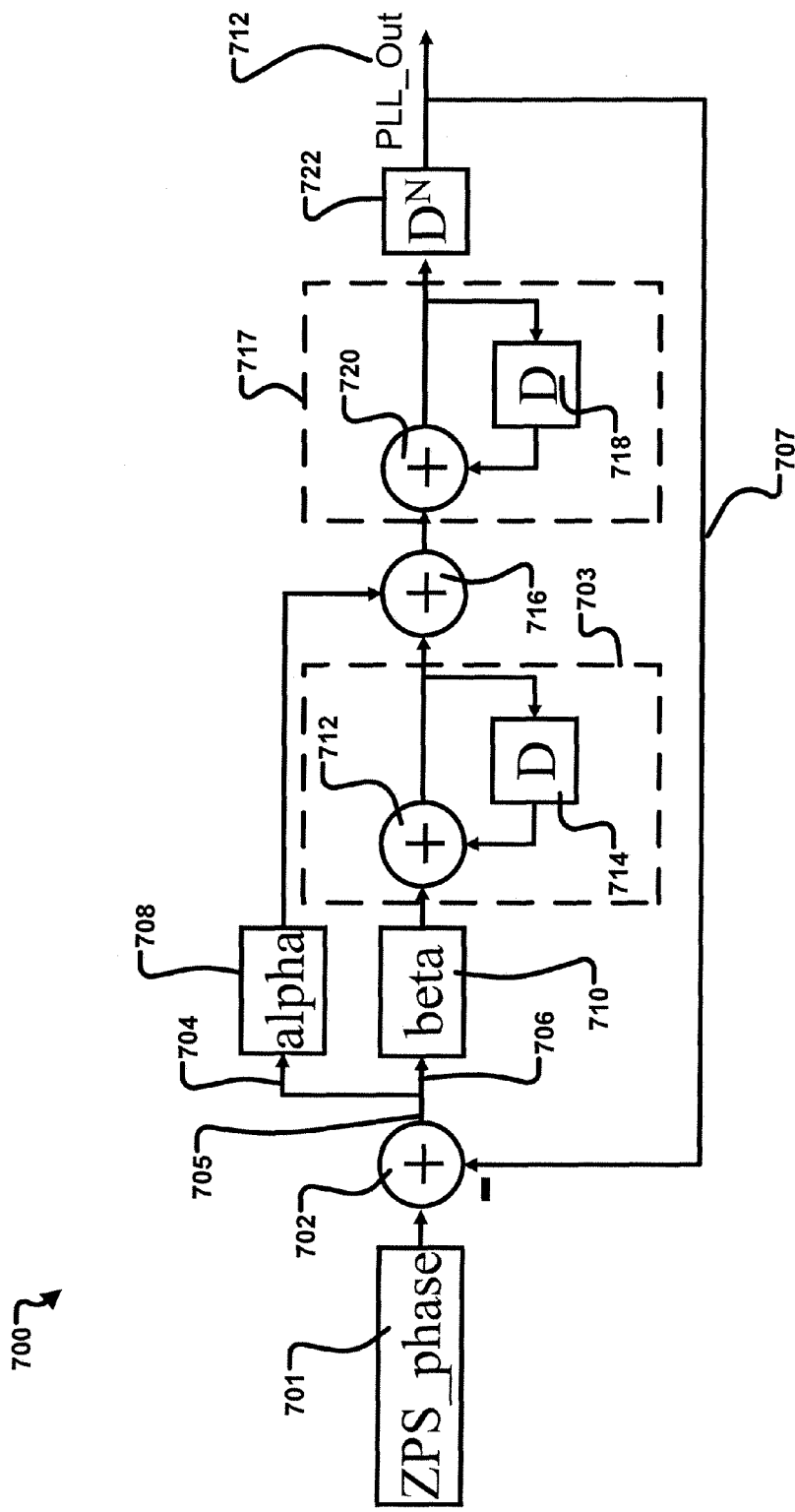
FIG. 7 is a block diagram showing an example phase-locked loop (PLL) circuit for spiral servo reference track detection.

FIG. 7 is a block diagram showing an example phase-locked loop (PLL) circuit 700 for spiral servo reference track detection. The PLL 700 is a digital circuit that includes digital comparison logic units, such as summers/subtractors 702, 712 and 720. The PLL 700 includes delays 714, 718 of 1 clock cycle. The summer/subtractor 712 and the delay 714 form a digital integrator 703. The summer/subtractor 720 and the delay 718 form another integrator 717. Alpha 708 and beta 710 are gains or scaling factors that affect the bandwidth of the loop. The two digital integrators operates as a loop filter that filters the output of the subtractor 702. DN 722 represents a delay of N clock cycles. The digital PLL 700 does not need to include a voltage controlled oscillator or a frequency divider.

A waveform read-back from a read-write head can be sampled asynchronously by an ND converter and samples are fed to the zps-phase block 701 and another block, such as a Viterbi detector 802 (see FIG. 8 below). The zps_phase block 701 operates on the received samples to detect the sampling phase of the A/C converter, and the detected phase information is sent to the PLL 700 continuously for the PLL 700 to lock on the detected phase.

As described above, the ZPS sampled waveform at the ZPS_phase block 701, is provided as an input signal to the subtractor 702. The subtractor 702 receives an output signal 712 of the PLL 700 as a second input signal through a feedback loop 707. The subtractor 702 compares the two input signals to compare the two phases of the two input signals and the digital PLL 700 eventually syncs the output signal 712 with the ZPS_phase signal 701.

The subtractor 702 generates an output or error signal 705 that drives the PLL 700. The generated error signal 705 is proportional to the phase difference between the two input signals.

The digital integrators 703 and 717 in combination processes or filters the generated error signal. The error signal generated by the phase detector 702 is a noisy estimate of the phase error. The digital integrators 703 and 717 operates as a loop filter to processes the error signal to generate a useful error while suppressing the effect of the noise. The values of the scaling factors beta and alpha affect the bandwidth of the loop. Larger the bandwidth, the PLL is able to detect the phase or frequency faster, but the larger bandwidth also introduces more noise.

The digital integrators 703 and 717 shown in FIG. 7 can be a second-order loop filter. The error signal 705 output from the subtractor 702 is split into two signal paths 704 and 706. The proportional or frequency path 704 multiplies the error signal 705 by a proportional gain or scaling factor, alpha 708. The phase or integral path 706 multiplies the error signal 705 by an integral gain or scaling factor, beta 710 and then integrates the scaled error signal using the digital integrator that includes the summer/subtractor 712 and the delay component 714. The integral path 706 performs phase and frequency offset detection using the digital integrator 703. Thus, the digital PLL 700 can use the digital integrator 703 to track a phase error and a frequency error. The signals from the two paths are provided to the summer/subtractor 716 and forwarded to the other digital integrator 717, which modifies the phase of the PLL output signal 712 in response to the detected phase and frequency offset. In this manner, the digital PLL 700 can be implemented as a second-order PLL. The second-order PLL can converge to a zero-error even with a frequency offset.

As described above, the values of the gain parameters alpha 708 and beta 710 can be selected to control the size of the loop bandwidth. The size of the loop bandwidth indicates the passband frequencies for the digital integrator or loop filter formed by 703 and 717.

The size of the loop bandwidth can affect the performance of the PLL 700. A wide loop bandwidth indicates that the loop filter can track a frequency offset or phase offset faster. However, the loop filter can also pass a wider portion of the noise spectrum.

After the phase and frequency offset detection, the output of the summer/subtractor 716 is forwarded to the other digital integrator 717 to drive the output signal 712 of the digital PLL 700 to be in sync with the ZPS_phase signal. The other digital integrator 717 includes the delay 718 and another summer/subtractor 720 for modifying the phase, based on the determined frequency offset, to maintain the sync. The phase advanced signal is passed through $D^N$ 722, a delay of N clock cycles or N samples, which models the delay due to hardware implementation. The output signal, PLL_OUT 712, of the PLL 700 is fed back to the summer/subtractor 702 of the PLL 700.

The digital PLL 700 compares the two phases of the two input signals to detect the phase difference. The frequency difference is reflected in this phase difference and will be captured over time. The error signal is then low-pass filtered and used to drive the other digital integrator 717, which creates an output phase. The output phase is fed back to the input of the digital PLL, producing a negative feedback loop. If the output phase drifts, the error signal will increase, driving the phase in the opposite direction to reduce the error.

The error signal may be either negative or positive depending on whether the phase of the PLL_OUT signal 712 is higher or lower than the phase of the ZPS_phase signal. The error signal is used to pull the digital PLL 700 back to the same frequency as the ZPS_phase frequency, and in phase with it.

Figure 8:
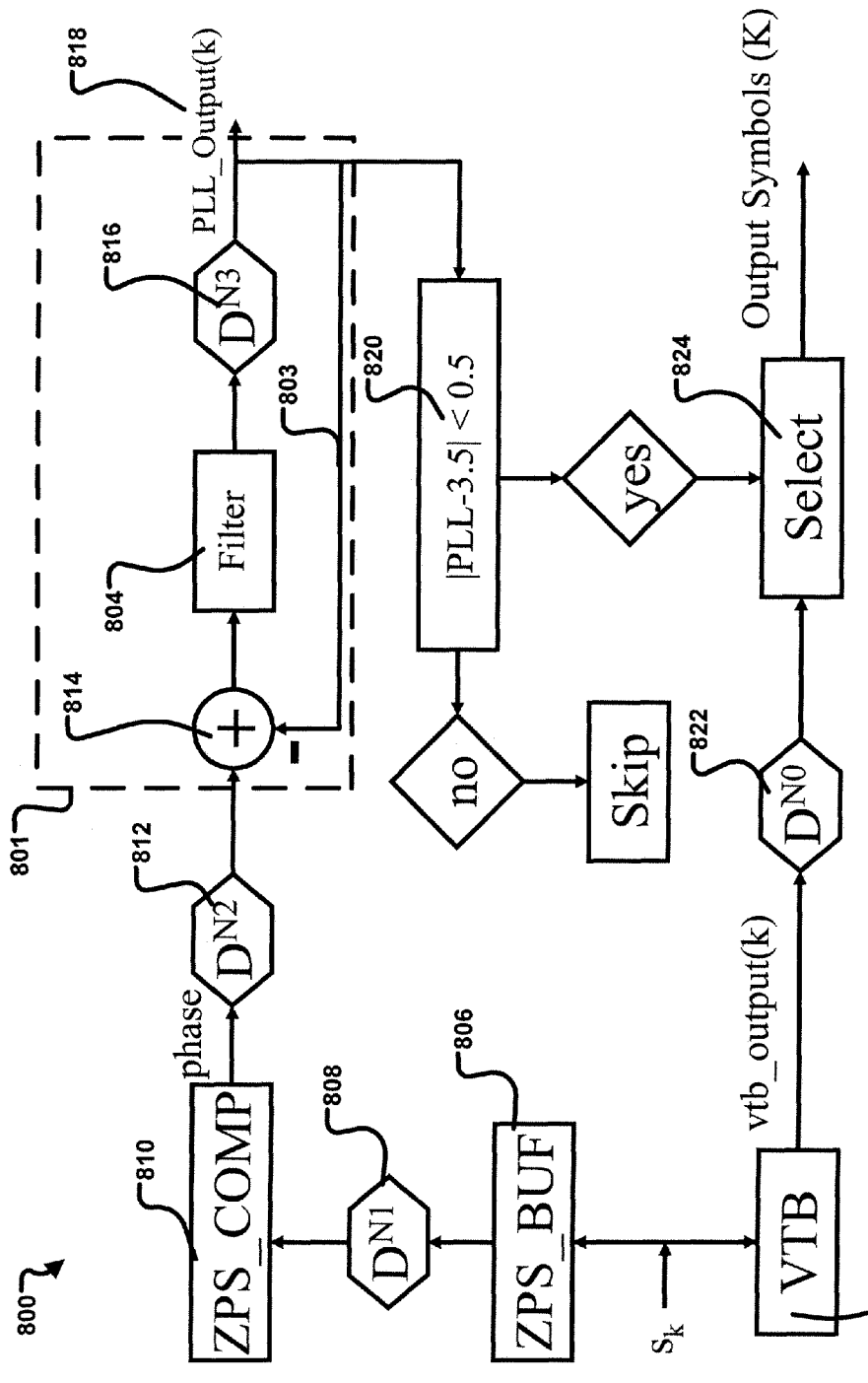
FIG. 8 is a block diagram showing an example system for detecting sync marks.

FIG. 8 is a block diagram of an example system 800 for detecting sync marks. The system 800 includes a Viterbi detector 802 and a digital PLL 801. The Viterbi detector 802 can be implemented using an apparatus as described with respect to FIG. 10 below. The digital PLL 801 can be similarly implemented as the digital PLL 700. The digital PLL 801 includes a loop filter 804, a phase detector 814, a delay, $D^{N3}$, 816 that represents a delay of N clock cycles or N samples, and a feedback path 803.

The system 800 includes a buffer 806 to save a sequence of samples for the ZPS operation; a delay $D^{N1}$ 808 associated with the buffer hardware of 806; a ZPS phase calculation unit 810; a delay $D^{N2}$ 812 of N clock cycles or N samples associated with the calculation hardware of 810; a delay $D^{N0}$ 822 of N clock cycles or N samples purposely inserted to align the output of Viterbi detector 802 and the output of a target phase detector 820. The output of the target phase detector 820 is used to check the output of digital PLL 801 to determine whether the output is within the vicinity of 3.5. When determined that the output is within the vicinity of 3.5, the corresponding output bit of the Viterbi detector 802 is selected as the symbol decision to determine whether a sync mark is detected.

A sampled waveform, $S_k$, (e.g., a diamond-shape waveform 500) is received and forwarded to a digital PLL 801 branch and a Viterbi detector 802 branch. To perform PLL lock, the ZPS sampled waveform is stored in the buffer 806 and used to sync the digital PLL 801 with the sampled waveform. When sampling 32 samples per ZPS, the buffer 806 can store the 32 samples per sampling. By syncing the digital PLL 801 with the sampled waveform, the phase of the sampled waveform can be determined.

The system may include some hardware delay 808 between the buffer 806 and the phase calculator, ZPS_COMP 810. The system can include additional delay 812 in calculating the phase of the ZPS samples. The ZPS phase information is provided to the phase detector 814 in addition to the feedback signal from the digital PLL output. The phase detector 814 can be implemented using the phase detector 702 of FIG. 7. The system can include another delay 816 in the digital PLL branch. The digital PLL 801 is synced or locked with the ZPS signal.

The output signal PLL_output 818, includes the phase information for each bit in the sampled waveform (refer back to FIG. 6 for the sample-phase relationship, where each bit represents different phase). The phase information from the PLL_output signal is checked using a target phase detector 820 to identify a target phase. For a 4T sampling period using ZPS, the target phase that indicates the end of each cycle is 3.5T (refer back to FIG. 6 for the sample-phase relationship). Thus, the target phase may change based on the sampling period. The target phase detector 820 shown in FIG. 8 uses a threshold value of 0.5 to detect a phase that is closest to the target phase of 3.5T. Those phases that are not identified as the target phase are skipped.

Using the target phase as the decision point, the Viterbi detector 802 is used to identify the location of the sync marks within the sampled waveform. The Viterbi detector 802 branch may include a delay 822 and a Viterbi output selector 824 to select the Viterbi output symbol at the target phase.

Referring back to FIG. 5, the gaps 502, 504, 506, 508 and 510 represent the location of sync marks in the servo information, which are used to accurately determine the position of the read-write head. For example, when the digital PLL output indicates the target phase of 3.5T, information from the Viterbi detector 802 is used to identify the sync marks. The target phase is 3.5T when the ZPS (starting form zero phase) is used to sample the waveform.

For a diamond-shape waveform (e.g., diamond-shape waveform 500), the Viterbi detector outputs a stream of Viterbi decision bit "1" for the majority of the sample bits in the waveform (i.e., the sinusoidal portion) and outputs a stream of Viterbi decision bit "0" for the minority of the sample bits, which represent the gaps between the sinusoidal, each bit of which indicates the sync marks. Alternatively, the Viterbi detector can be configured to output a "0" for the sinusoidal portion and a "1" for the gaps. Each bit in the Viterbi decision stream represents a different phase. In order to obtain a reliable detection from the Viterbi detector, the system looks at the Viterbi output at the correct target phase. The Viterbi detector 802 can generate the Viterbi decision stream of bits using the process described with respect to FIG. 9 below.

When the digital PLL syncs with the sampled waveform to obtain the current phase of the waveform, the target phase (e.g., 3.5T) is identified as the correct phase for the sync marks. However, a sync mark is not present at every 3.5T sample. Thus, the Viterbi detector 802 is used to identify the minority signal at or near the indicated 3.5T phase to detect the sync marks. The Viterbi output selector 824 is used to select the location of the sync mark at the indicated target phase.

Figure 9:
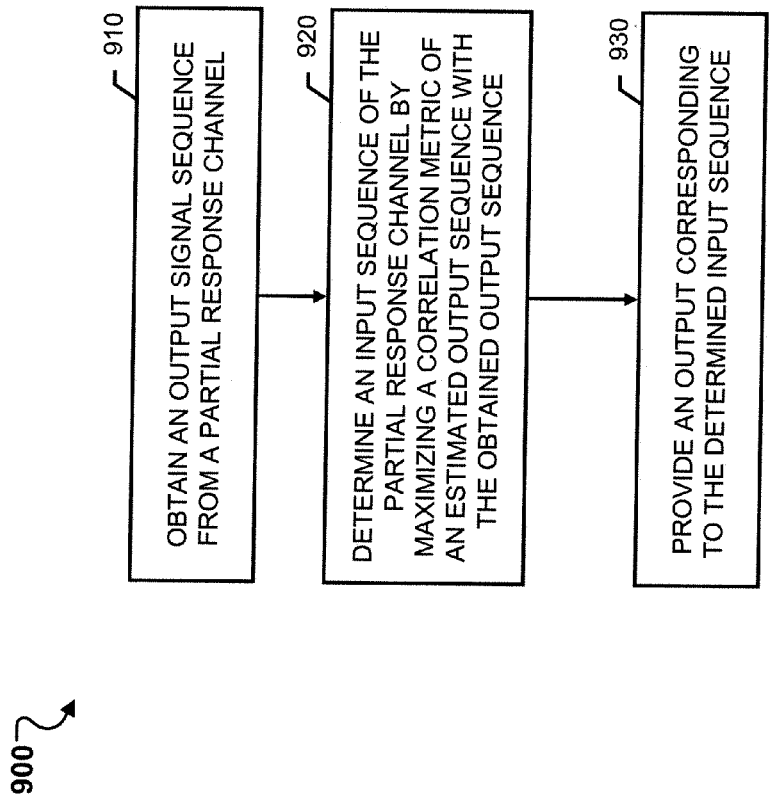
FIG. 9 is a flowchart illustrating Viterbi detection using a correlation metric.

The Viterbi detector 802 can be implemented as described in a copending U.S. patent application Ser. No. 10/799,543 entitled "VITERBI DETECTION USING A CORRELATION METRIC." FIG. 9 is a flowchart illustrating Viterbi detection 900 using a correlation metric. The Viterbi detector (e.g., Viterbi detector 802) obtains an output signal sequence from a partial response channel (e.g., sampling a signal, such as $S_k$, generated from a data storage medium) 910. The Viterbi detector determines an input sequence of the partial response channel by maximizing a correlation metric of an estimated output sequence with the obtained output sequence 920. The Viterbi detector estimates the estimated output sequence based on the partial response channel. The Viterbi detector provides an output corresponding to the determined input sequence 930.

Providing the output corresponding to the determined input sequence can involve providing the determined input sequence to an additional sequence processing component. Providing the output corresponding to the determined input sequence can involve other or different outputs as well. Moreover, the output signal sequence obtained from the partial response channel can be a convolution of the input sequence and a target polynomial of the partial response channel.

The input sequence to a target channel can be defined as $B=[b_0\ b_1\ \ldots\ b_N]$, and the target partial response can be defined as $P=[p_0\ p_1\ \ldots\ p_M]$. If the channel noise is white, additive and Gaussian, then the output of the partial response channel can be given as $Y=[y_0\ y_1\ \ldots\ y_N]$, where $$y_k = \sum_{i=0}^{M} b_{k-i} \cdot p_i + n_k,$$

and $n_k$ is the additive white Gaussian noise. Y is the convolution of the input sequence and the target polynomial, as received.

A traditional Viterbi detector finds an input sequence, $\hat{B}=[\hat{b}_0\ \hat{b}_1\ \ldots\ \hat{b}_N]$, such that the corresponding output sequence of the partial response channel, $\hat{Y}=[\hat{y}_0\ \hat{y}_1\ \ldots\ \hat{y}_N]$, is the closest to the real sampled output sequence, Y, in the sense of Euclidean distance. Traditional Viterbi minimizes the quantity, $$\sum_{k=0}^{N} (y_k - \hat{y}_k)^2,$$

by the choice of $\hat{B}$.

When there is uncertainty about the gain of the partial response channel, then a gain factor can be introduced in the target partial response, and the target partial response can be written as $P'=[\alpha p_0\ \alpha p_1\ \ldots\ \alpha p_M]$. This equation assumes that the function only changes in the amplitude; the relative scaling of the different terms remains the same. The traditional Viterbi decision sequence should then be the estimated input sequence $\hat{B}'=[\hat{b}'_0\ \hat{b}'_1\ \ldots\ \hat{b}'_N]$, which minimizes the quantity, $$\sum_{k=0}^{N} (y_k - \hat{y}'_k)^2, \tag{1}$$

where $$\hat{y}'_k = \sum_{i=0}^{M} \hat{b}'_{k-i} \cdot \alpha \cdot p_i = \alpha \cdot \sum_{i=0}^{M} \hat{b}'_{k-i} \cdot p_i = \alpha \cdot y^*_k,$$

and $$y^*_k = \sum_{i=0}^{M} \hat{b}'_{k-i} \cdot p_i.$$

The quantity in equation (1) can be re-written as, $$\sum_{k=0}^{N} (y_k - \hat{y}'_k)^2 = \tag{2}$$

$$\sum_{k=0}^{N} (y_k - \alpha \cdot y^*_k)^2 = \sum_{k=0}^{N} y_k^2 + \alpha^2 \cdot \sum_{k=0}^{N} (y^*_k)^2 - 2\alpha \sum_{k=0}^{N} y_k \cdot y^*_k.$$

The three terms on the right side of equation (2) can be understood as the summation of the square of the real output of the channel, the summation of the square of the estimated channel output scaled by the channel gain factor, and the cross-correlation of the real channel output and the estimated channel output scaled by the channel gain factor. Since $$\sum_{k=0}^{N} y_k^2$$

is not a function of the choice of $\hat{B}$ (the estimated input sequence), minimizing the quantity in equation (2) over B' is equivalent to minimizing $$\alpha^2 \cdot \sum_{k=0}^{N} (y_k^*)^2 - 2\alpha \sum_{k=0}^{N} y_k \cdot y_k^* \quad (3)$$

or, since $\alpha$ is not a function of the estimated input, $$\alpha \cdot \sum_{k=0}^{N} (y_k^*)^2 - 2 \sum_{k=0}^{N} y_k \cdot y_k^*. \quad (4)$$

When $\alpha$ is small, the first term in equation (4) can be ignored, and the Viterbi algorithm can be used to minimize the second term (i.e., maximize the correlation, as the second term is negative in equation (4)). When the noise power is not changing with the amplitude of the signal and the signal amplitude is very small, maximizing the second term is essentially the same as minimizing the whole quantity, providing close to optimal performance.

When the signal amplitude is very large, the first term in equation (4) is still ignored, resulting in less than optimal performance as compared with traditional Viterbi in terms of error probability. But because the signal to noise ratio (SNR) is higher with larger amplitudes of the signal, good results can still be obtained. By maximizing the correlation between the sampled sequence and the recovered sequence, received sequences can be accurately interpreted, even when the signal carrying the sequences has widely varying amplitude. A signal processing apparatus using these techniques can be biased to the worst case, guaranteeing the performance of the worst case scenario.

The system (e.g., 800) can apply different algorithms to treat the delays and qualify the amplitude. For example, the ZPS delay (N1) is 16T. The computation delay (N2) is 64T. The digital PLL pipe delay (N3) is 4T. The amplitude calculation is performed using ZPS with a sample window of 32 samples. The thresholds of the sample window is 40 percent with the window up once per diamond shape. The Viterbi detector generates a stream of output symbols as described above with the digital PLL phase pointing to the correct interleave to detect the sync marks. These examples are provided for illustrative purposes only, and other various are possible. For example, some of the delay values are hardware-dependent. Also, the window length for ZPS computation can be configured while considering a trade-off between the accuracy of the ZPS phase calculation and the frequency of performing the update. The threshold on the signal amplitude can be provided to guarantee the quality of the signal so that the calculations that follow are reliable.

Figure 10:
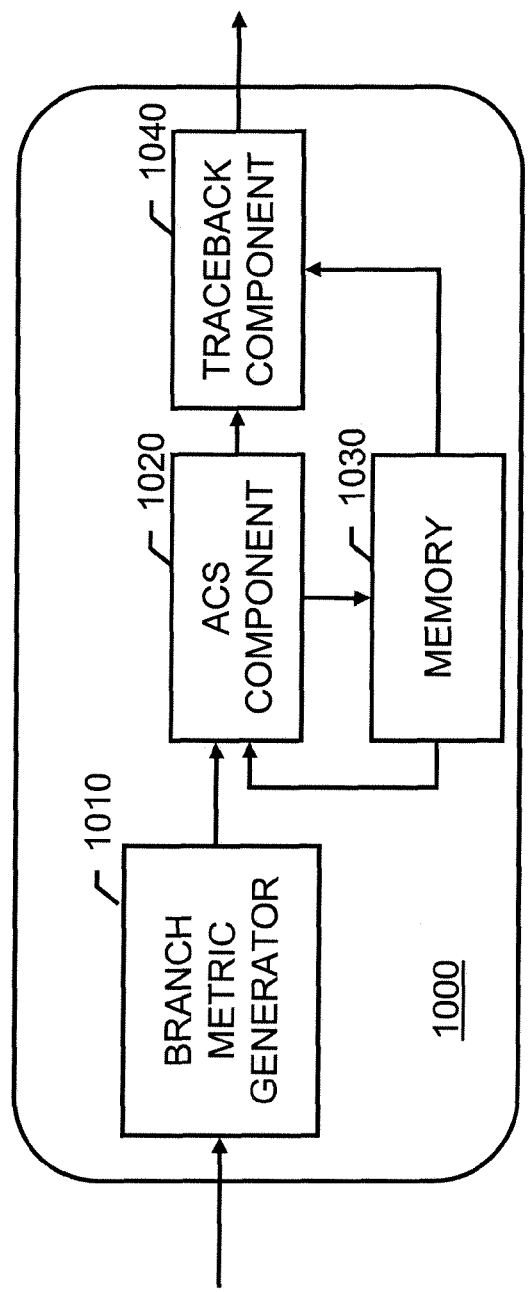
FIG. 10 is a block diagram showing an example signal processing apparatus that implements Viterbi detection using a correlation metric.

FIG. 10 is a block diagram showing an example signal processing apparatus 1000 that implements Viterbi detection using a correlation metric as described with respect to FIGS. 8 and 9 above. The apparatus 1000 can be implemented as a Viterbi detector (e.g., Viterbi detector 802). The apparatus 1000 includes a branch metric generator 1010, an add-compare-select (ACS) component 1020, a memory 1030, and a traceback component 1040. The branch metric generator 1010 calculates correlation branch metrics between received data and predetermined code sequences, and supplies the results to the ACS component 1020.

The ACS component 1020 adds the branch metrics to any saved state metrics (i.e., retained correlation path metrics) according to a trellis, which shows the progression of the decoding in time based on the inputs. The ACS component 1020 compares current correlation path metrics and selects the paths in the trellis with the best correlation path metrics (e.g., maximum or minimum value, depending on implementation). The selected paths and their path metrics can be saved in the memory 1030. The memory 1030 can be one or more random access memories, and can be integrated into the various components of the apparatus 1000 (e.g., path metrics can be saved in a first memory integrated into the ACS component 1020, and survivor paths can be saved in a second memory integrated into the traceback component 1040).

The traceback component 1040 looks at the survivor paths to identify the path having the largest correlation with the received data, and outputs decoded data. If the target polynomial is $T(D)=p_0+p_1D+ \ldots +p_MD^M$, then the trellis has $2^M$ states. A transition, or branch, in the trellis represents a possible change from state to state. For each of the states, a survivor path and a path metric can be updated and saved for each input sample to the detector.

Assuming binary data detection, for each current state there are two immediate previous states that lead into the current state. The path metric of this current state can be updated according to the following equation $$pm_k^j = \max\{pm_{k-1}^m + bm_{m,j}, pm_{k-1}^n + bm_{n,j}\}, \quad (5)$$

where $pm_k^j$ is the path metric of the j-th state at time k; $pm_{k-1}^m$ and $pm_{k-1}^n$ are the path metrics at time k−1 of the m-th and n-th states, respectively, which lead into the j-th state; $bm_{x,j}$ is the metric of the branch that connects the X-th state (m or n) and the j-th state, and can be defined as:

$$bm_{X,j} = y_k \cdot \hat{y}_k, \quad (6)$$

where $\hat{y}_k$ is the ideal noiseless output associated with that branch.

Once the path metric for the j-th state is decided, its path memory can also be decided by inheriting the path memory of the one of the two previous states (m or n) that gives it the best path metric, and adding to this inherited path the most current one of the binary bits that constitute the current, j-th, state. Using these modified Viterbi decoding techniques, all the survivor paths associated with all the different states can merge in M steps (e.g., M clock cycles), and thus the path memories need not be longer than M in some implementations.

The apparatus 1000 can also include a controller, and input and output buffers, including a frame synchronization mechanism. The apparatus 1000 can be implemented in any number of different systems and devices, including communications equipment (e.g., in wireless communications where fading issues and varying-amplitude signals are common) and data storage equipment. For example, the apparatus 1000 can include a read channel, which can be implemented as one or more integrated circuit (IC) devices, and the read channel can include a variable-gain amplifier (VGA), a filter, and an ADC (analog to digital converter). The range of the signal to be processed can be estimated in advance, and the target partial response for use in the modified Viterbi detector can be based on the maximum value of this range estimate.

Figure 11:
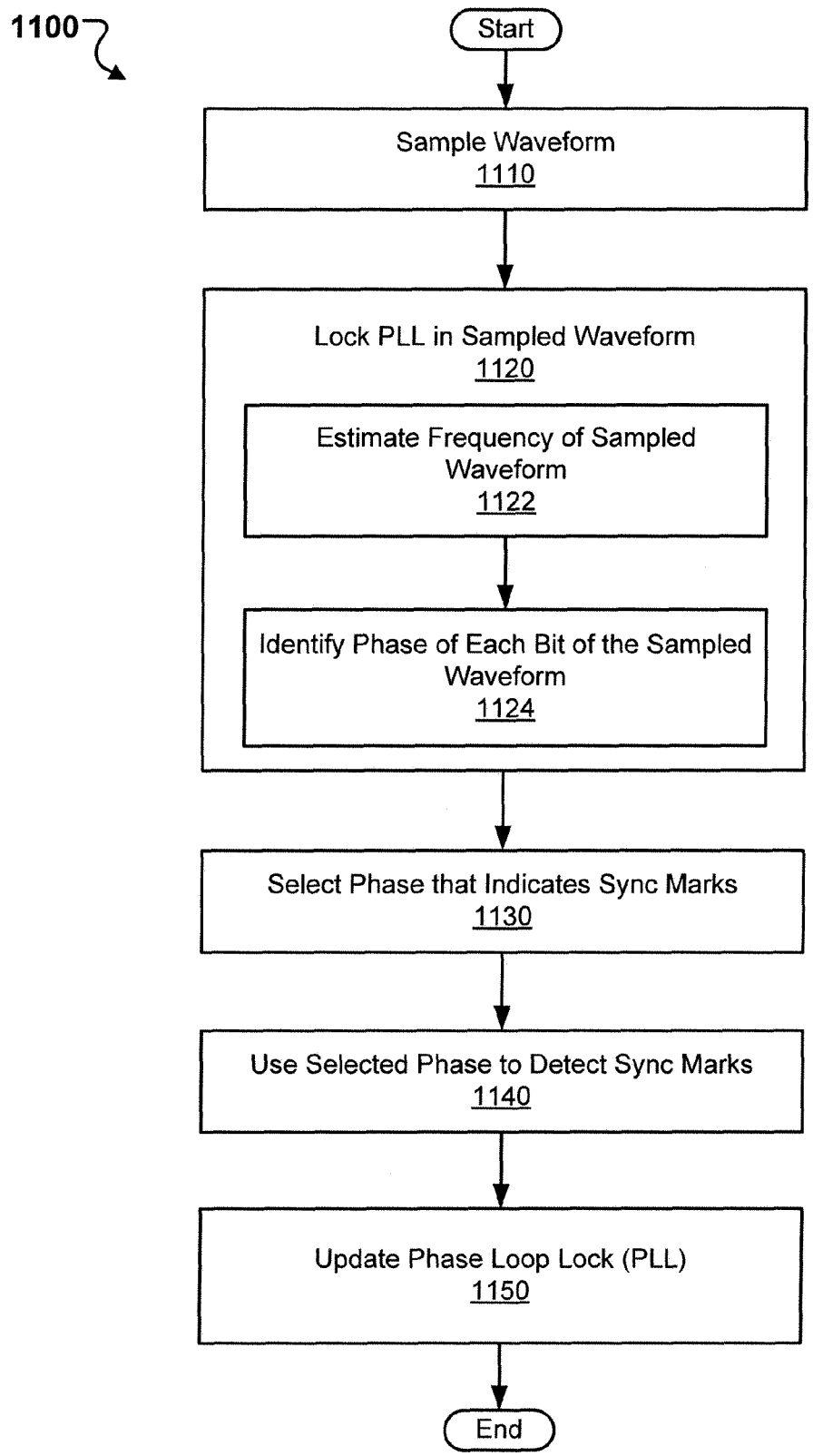
FIG. 11 shows an example process for using a system to phase-lock a sampled waveform to a PLL.

FIG. 11 shows an example process 1100 for using a system (e.g., system 100) to phase-lock a sampled waveform with a digital PLL. The self-servo write system can use phase-locked loop (PLL) techniques to detect the phase of each bit in a sampled waveform. For example, a second-order digital PLL for spiral servo detection can be implemented to track the phase in the sampled waveform.

The system samples a waveform using ZPS 1110. For example, the system can use a 32-sample ZPS window to sample every 32 samples or bits of the sample waveform. The digital PLL is synced with the sampled waveform to determine the phase information for the sampled waveform 1120. Syncing the digital PLL can include estimating the frequency of the sampled waveform 1122 and identifying the phase of the waveform 1124.

The system checks the digital PLL phase output at every sample to select the target phase that indicates the location of the sync marks 1130. For a ZPS sampled waveform at a 4T sampling period, the target phase is 3.5T as shown in FIG. 6 above. The selected target phase is used to detect the sync marks by signaling the Viterbi detector to identify the gaps in the sampled waveform at the indicated 3.5T phase 1140.

The system updates the digital PLL using the phase from the ZPS 1150. Updating the digital PLL tracks the phase in the sampled waveform to improve the sync even in the presence of phase drift and frequency shift. When performing ZPS every 32 (programmable) samples, the digital PLL is updated every 32 sample. For the 32 sample window, the digital PLL is updated every 32 samples, for example. Updating the digital PLL allows the system to detect the presence of phase drift and/or frequency shift. Using the digital PLL allows for stable detection of the sync marks even in frequency variation.

The waveforms read from the read-write head can include abrupt and significant phase shifts within the duration of one diamond-shape area. The digital PLL as described in this specification can quickly lock on the phase and frequency of the read-back waveforms and provide reliable target detection phase for identifying the sync marks. The digital PLL can also provide reliable phase demodulation information. With the digital PLL in place, the spiral servo reference track detection as described in this specification may handle +/−0.5 percent of frequency offset in the sampled waveforms. Further, by combining the digital PLL with a Viterbi detector, the system can accurately detect sync marks used to identify the location of the read-write head and the spiral servo reference tracks.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An apparatus comprising:
   phase locking circuitry comprising
      a phase calculator to identify a phase of a sampled data, and
      a phase-locked loop to generate an output signal and phase-lock the generated output signal with the identified phase of the sampled data to produce a phase-locked output signal; and
   detector circuitry to receive the sampled data and communicate with the phase locking circuitry to obtain phase information of the phase-locked output signal, comprising
      a detector to generate a stream of decision bits for the received sampled data, wherein each bit in the stream is associated with a different phase, and
      an output selector to select at least one bit from the stream based on the received phase information of the phase-locked output signal.

2. The apparatus of claim 1, wherein the phase locking circuitry comprises a buffer to communicate with the phase calculator, wherein the buffer is configured to store the sampled data.

3. The apparatus of claim 2, wherein the phase locking circuitry comprises a target phase detector to check the phase of each bit to detect a target phase that indicates a location of a sync mark.

4. The apparatus of claim 3, wherein the output selector is configured to select the at least one bit based on the detected target phase that indicates the location of the sync mark.

5. The apparatus of claim 3, comprising:
a head-disk assembly comprising
  a transducer comprising a read-write head having a read gate and a write gate, and
  a spindle to rotate a machine-readable medium; and
a control unit to communicate with the head-disk assembly, the phase-locking circuitry and the detector circuitry to cause the head-disk assembly to perform operations comprising
  obtain the sampled data using the read gate of the read-write head, and
  write a servo wedge on a surface of the machine-readable medium based on at least one received bit that indicates the location of the sync mark.

6. The apparatus of claim 5, wherein the control unit communicates with the head-disk assembly to cause the head-disk assembly to obtain the sampled data using zero-phase-start.

7. The apparatus of claim 5, wherein the sampled data comprises an asynchronous waveform.

8. The apparatus of claim 1, wherein the phase-locked loop comprises:
a comparison logic unit to generate an error signal based on a detected difference between the sampled data and the generated output signal;
a phase offset detector to identify at least a phase offset between the sampled data and the generated output signal based on the generated error signal; and
a phase modifier to modify the phase of the generated output signal based on the identified phase offset to phase-lock the generated output signal with the sampled data to produce the phase-locked signal.

9. The apparatus of claim 1, wherein the phase-locking circuitry is configured to phase-lock the generated output signal with the sampled data, wherein the sampled data is undergoing a phase drift or a frequency offset.

10. The apparatus of claim 1, wherein the detector circuitry comprises Viterbi detector circuitry to improve the phase-lock.

11. A method performed by a data reading device comprising:
obtaining sampled data;
calculating a phase of the sampled data comprising
  identifying a target phase that indicates a location of a sync mark;
phase-locking an output of a phase-locked loop with the calculated phase of the sampled data;
generating a stream of decision bits for the sampled data; and
selecting at least one bit from the stream that corresponds to the identified target phase.

12. The method of claim 11, wherein the stream of decision bits comprises a stream of Viterbi decision bits for the sampled data.

13. The method of claim 12, comprising:
checking the phase for each bit to detect the target phase that indicates the location of the sync mark.

14. The method of claim 13, comprising:
selecting the at least one bit from the stream based on the detected target phase that indicates the location of the sync mark.

15. The method of claim 13, comprising:
identifying the location of the sync mark based on the detected target phase;
detecting angular and radial locations of a read-write head based on the identified location of the sync mark; and
positioning the read-write head based on the identified locations of the read-write head to write a servo wedge on a surface of a machine-readable medium.

16. The method of claim 11, wherein phase-locking the output of a phase-locked loop with the sampled data comprises:
generating an error signal based on a detected difference between the sampled data and the output of the phase-locked loop;
identifying a phase offset between the sampled data and the output of the phase-locked loop based on the generated error signal; and
modifying a phase of an output signal based on the identified phase offset to phase-lock the output of the phase-locked loop with the sampled data.

17. The method of claim 11 comprising:
using zero-phase-start to generate the sampled data from input data.

18. The method of claim 17, wherein phase-locking the output of a phase-locked loop with the sampled data comprises phase-locking the output with the asynchronous waveform, wherein the asynchronous waveform is undergoing a phase drift or a frequency offset.

19. The method of claim 11, wherein obtaining the sampled data comprises receiving an asynchronous waveform.

20. A non-transitory computer-readable medium encoded with a computer program, the computer program comprising instructions that when executed by data processing apparatus cause the data processing apparatus to perform operations comprising:
obtaining sampled data;
calculating a phase of the sampled data comprising
  identifying a target phase that indicates a location of a sync mark;
phase-locking an output of a phase-locked loop with the calculated phase of the sampled data;
generating a stream of decision bits for the sampled data; and
selecting at least one bit from the stream that corresponds to the identified target phase.

* * * * *